United States Patent
Gray et al.

(10) Patent No.: US 6,578,871 B2
(45) Date of Patent: Jun. 17, 2003

(54) VEHICLE OCCUPANT WEIGHT DETECTION SYSTEM WITH OCCUPANT POSITION COMPENSATION

(75) Inventors: Charles A. Gray, Noblesville, IN (US); James F. Patterson, Greentown, IN (US); Chance Lee Scales, Kokomo, IN (US); Phillip E Kaltenbacher, II, Kokomo, IN (US); Royce L. Rennaker, Converse, IN (US); Duane D. Fortune, Lebanon, IN (US); Stuart Stites Sullivan, Peru, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/972,638

(22) Filed: Oct. 9, 2001

(65) Prior Publication Data

US 2003/0067149 A1 Apr. 10, 2003

(51) Int. Cl.[7] .............................................. B60R 21/32
(52) U.S. Cl. ...................................................... 280/735
(58) Field of Search ........................ 280/735; 180/273; 297/217.2; 340/666, 667

(56) References Cited

U.S. PATENT DOCUMENTS

| | | | | |
|---|---|---|---|---|
| 5,821,633 A | * | 10/1998 | Burke et al. ................. | 180/273 |
| 5,984,349 A | * | 11/1999 | Van Voorhies .............. | 340/945 |
| 6,043,736 A | * | 3/2000 | Sawahata et al. ........... | 280/735 |
| 6,056,079 A | * | 5/2000 | Cech et al. .................. | 177/144 |
| 6,070,115 A | * | 5/2000 | Oestreicher et al. ........ | 280/735 |
| 6,076,853 A | * | 6/2000 | Stanley ........................ | 177/208 |
| 6,242,701 B1 | * | 6/2001 | Breed et al. ................. | 177/144 |
| 6,243,634 B1 | * | 6/2001 | Oestreicher et al. ........ | 280/735 |
| 6,329,914 B1 | * | 12/2001 | Shieh et al. ................. | 180/271 |
| 6,382,667 B1 | * | 5/2002 | Aoki ........................... | 280/735 |
| 6,394,490 B2 | * | 5/2002 | Osmer et al. ................ | 180/271 |
| 6,416,080 B1 | * | 7/2002 | Gillis et al. .................. | 280/735 |

* cited by examiner

*Primary Examiner*—Lesley D. Morris
*Assistant Examiner*—L. Lum
(74) *Attorney, Agent, or Firm*—Robert M. Sigler

(57) ABSTRACT

An improved occupant detection system and method includes a fluid-filled polymeric seat cushion bladder defining multiple fluid-filled chambers corresponding to different areas of the seat cushion, with no fluid flow between such chambers. Fluid pressures in the various individual chambers are detected and processed to develop a weight estimation that is compensated for occupant position. The chambers are configured to detect occupant weight in at least forward, rearward, inboard and outboard regions of the bottom seat cushion. When the detected pressures are unevenly distributed and the pressure in the forward, rearward, inboard or outboard regions of the seat exceeds the average pressure by at least a predetermined amount, a composite pressure indicative of occupant weight is adjusted in a direction to bias the suppression status in favor of allowing restraint deployment, unless the occupant is forwardly positioned on a seat that is also forwardly positioned.

3 Claims, 7 Drawing Sheets

VEHICLE OCCUPANT WEIGHT DETECTION SYSTEM WITH OCCUPANT POSITION COMPENSATION

TECHNICAL FIELD

This invention relates to a system and method of detecting the weight and position of an occupant of a motor vehicle for purposes of allowing or suppressing air bag deployment.

BACKGROUND OF THE INVENTION

Vehicle occupant detection systems are useful in connection with air bags and other pyrotechnically deployed restraints as a means of judging whether, and how forcefully, to deploy the restraint. One fundamental parameter in this regard is the weight of the occupant, as weight may be used as a criterion to distinguish between an adult and an infant or small child.

One prior weight estimation technique is to install an array of variable resistance pressure sensitive elements in the seat, and to sum the individual pressures to determine occupant weight. A restraint system based on this technique is shown and described in the U.S. Pat. No. 5,474,327, issued on Dec. 12, 1995, and assigned to the assignee of the present invention. In practice, however, such systems tend to be relatively costly to implement, and require a significant amount of signal processing for proper calibration and weight estimation.

Another approach for determining occupant weight, disclosed for example in U.S. Pat. No. 5,987,370, issued on Nov. 16, 1999, and assigned to the assignee of the present invention, involves installing a fluid-filled polymeric bladder in or under the bottom cushion of a vehicle seat, and measuring the fluid pressure in the bladder. As disclosed in the U.S. Pat. No. 6,101,436, issued on Aug. 8, 2000, and also assigned to the assignee of the present invention, the bladder may have multiple cells formed by a pattern of spot welds between top and bottom layers of the bladder, creating an array of generally circular or hexagonal cells between which the fluid can freely flow. This approach can maximize the pressure response for improved sensitivity, and minimize the amount of fluid required to detect occupant weight, thereby minimizing the weight of the fluid-filled bladder. However, the position of the occupant on the seat can influence the indicated weight, and therefore, the decision as to whether to allow or suppress air bag deployment. Also, the decision as to whether to allow or suppress air bag deployment may depend on occupant position, as well as occupant weight. For example, if the occupant is very close to the point of deployment, it may be desired to disable deployment regardless of the occupant weight. For this reason, a number of position detection systems have been devised for independently determining if the occupant is out of position and in danger of injury due to air bag deployment. However, the use of multiple independent sensing systems significantly increases the system cost and complexity, and introduces a number of implementation issues, such as sensor placement and calibration. Accordingly, what is desired is a simple and cost-effective occupant detection system that takes into consideration both occupant weight and occupant position.

SUMMARY OF THE INVENTION

The present invention is directed to an improved occupant detection system involving a fluid-filled polymeric seat cushion bladder defining multiple fluid-filled chambers corresponding to different regions of the seat cushion, with no fluid flow between such chambers, and where the fluid pressures in the various individual chambers are detected and processed to develop a weight estimation that is compensated for occupant position. According to the invention, the chambers are configured to detect occupant weight in at least forward, rearward, inboard and outboard regions of the bottom seat cushion. When the detected pressures are unevenly distributed and the pressure in the forward, rearward, inboard or outboard regions of the seat exceeds the average pressure by at least a predetermined amount, a composite pressure indicative of occupant weight is adjusted in a direction to bias the suppression status in favor of allowing restraint deployment, unless the occupant is forwardly positioned on a seat that is also forwardly positioned.

BRIEF DESCRIPTION OF THE DRAWINGS

FIGS. 2A and 2B depict four-chamber configurations, FIG. 2C depicts a nine-chamber configuration, FIGS. 2D and 2F depict eight-chamber configurations, and FIG. 2E depicts a five-chamber configuration.

DESCRIPTION OF THE PREFERRED EMBODIMENT

Figure 1:
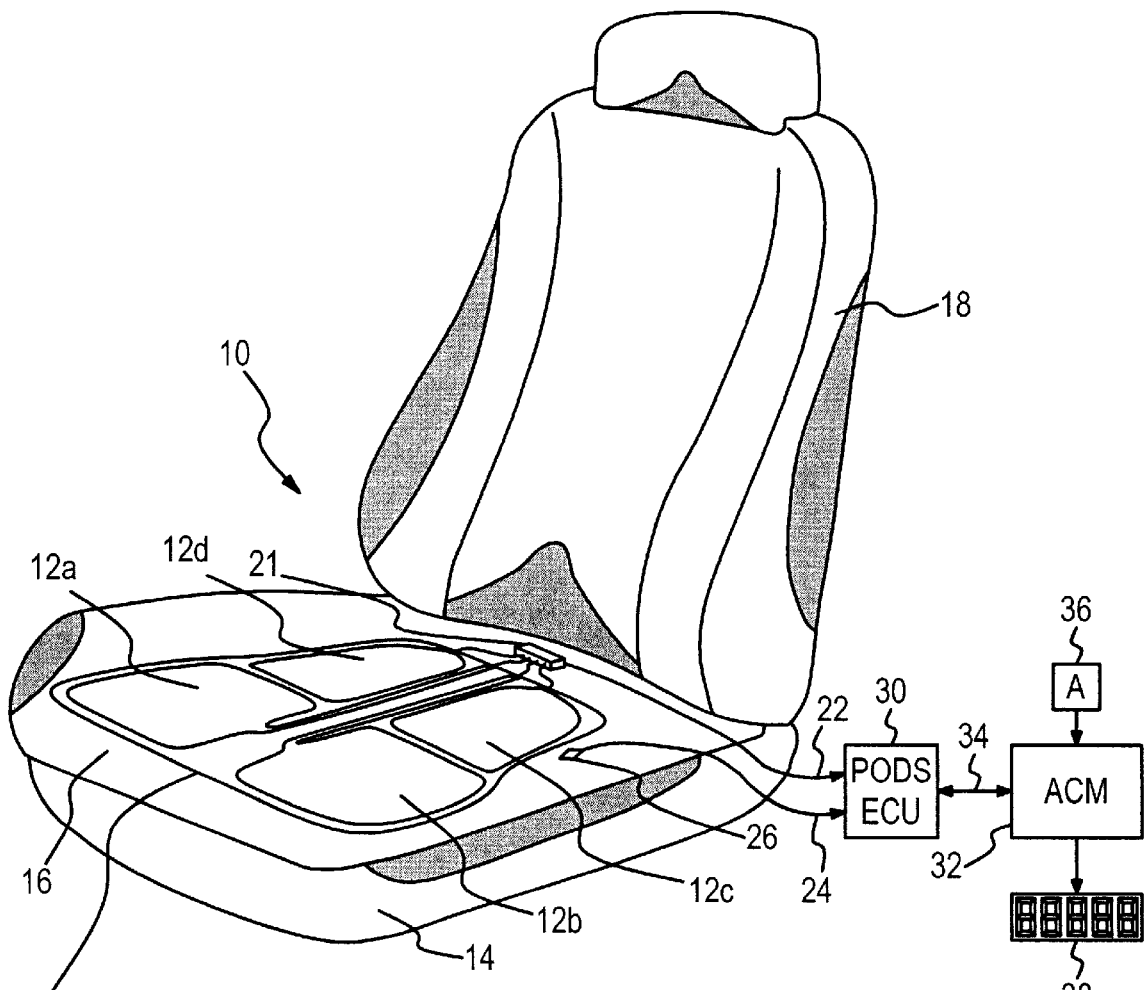
FIG. 1 is a system diagram illustrating a passenger seat of a vehicle equipped with a fluid-filled bladder, a passenger occupant detection electronic control unit (PODS ECU), an airbag control module (ACM) according to this invention.

The present invention is disclosed in the context of a restraint system for an occupant of a vehicle passenger seat 10 that is adjustable at least in forward and rearward directions, where deployment of an inflatable restraint such as a frontal air bag is subject to being disabled or suppressed based on a characterization of the occupant weight and position. Referring to FIG. 1, the vehicle seat 10 is supported on a frame 14, and includes foam cushions 16 and 18 on the seat bottom and back. The bladder 12 is disposed in or under the foam bottom cushion 16 substantially parallel with the central seating surface, and has multiple chambers containing a fluid such as silicone which is non-corrosive, and not subject to freezing at extreme ambient temperatures. In addition, a rigid back-plate may be placed under the bladder 12 to provide a suitable reaction surface, as disclosed for example in the U.S. patent application Ser. No. 09/311,576, (Attorney Docket No. H-203753), assigned to the assignee of the present invention, and incorporated herein by reference.

As described more completely below in reference to FIGS. 2A–2F, the bladder 12 is constructed to define a plurality of individual, mutually isolated, fluid-filled chambers 12a, 12b, etc., each such chamber being equipped with a pressure sensor 20a, 20b, etc. for detecting the fluid pressure in such chamber. Conductors carrying the pressure signals developed by the pressure sensors 20a, 20b, etc. are joined to connector 21, and communicated to a microprocessor-based passenger occupant detection system electronic control unit (PODS ECU) 30 via a pressure signal bus 22. The PODS ECU 30 processes the pressure signals along with a cushion temperature signal on line 24 to determine if restraint deployment for the occupant of seat 10 should be allowed or suppressed in a sufficiently severe crash event. The temperature signal on line 24 is developed by a temperature sensor 26 that may be separate from bladder 12 as indicated in FIG. 1, or integrated with one of the pressure sensors 20a, 20b, etc. The suppression status (i.e., allow or suppress) is communicated from PODS ECU 30 to an airbag control module (ACM) 32 via bi-directional communication bus 34. The ACM 32 may be conventional in nature, and operates to deploy one or more airbags or other restraint devices (not shown) for vehicle occupant protection based on the acceleration signals obtained from one or more acceleration sensors (A) 36, and the suppression status obtained from PODS ECU 30. In general, ACM 32 deploys the restraints if the acceleration signals indicate the occurrence of a severe crash, unless the PODS ECU 30 indicates that deployment should be suppressed. Of course, other more sophisticated controls are also possible, such as controlling the deployment force of the restraint devices based on occupant characterization, for example. Also, ACM 32 may be configured to communicate the suppression status to a driver display device 38 to enable the driver to verify that the suppression status is appropriate.

Figure 2A:
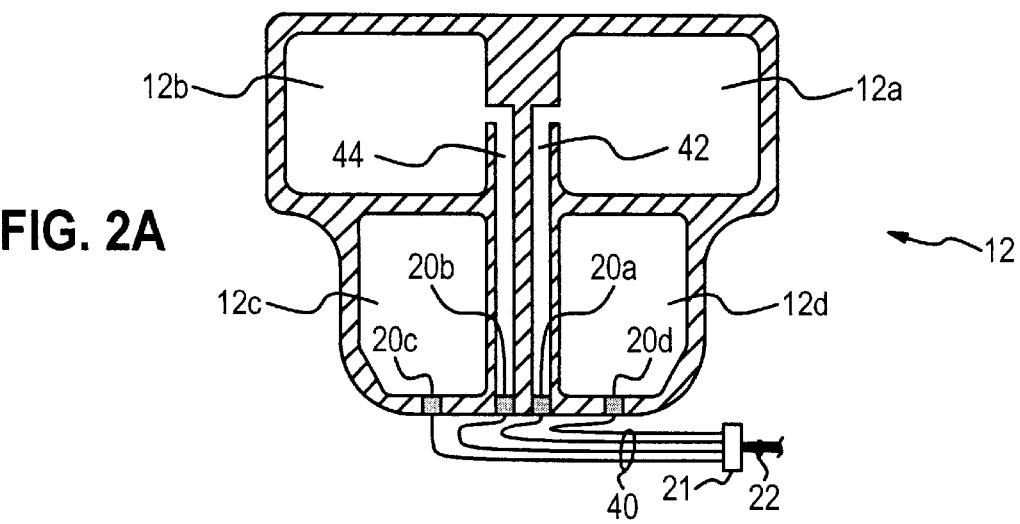
FIGS. 2A–2F depict alternate implementations of the fluid-filled bladder of FIG. 1.
Figure 2B:
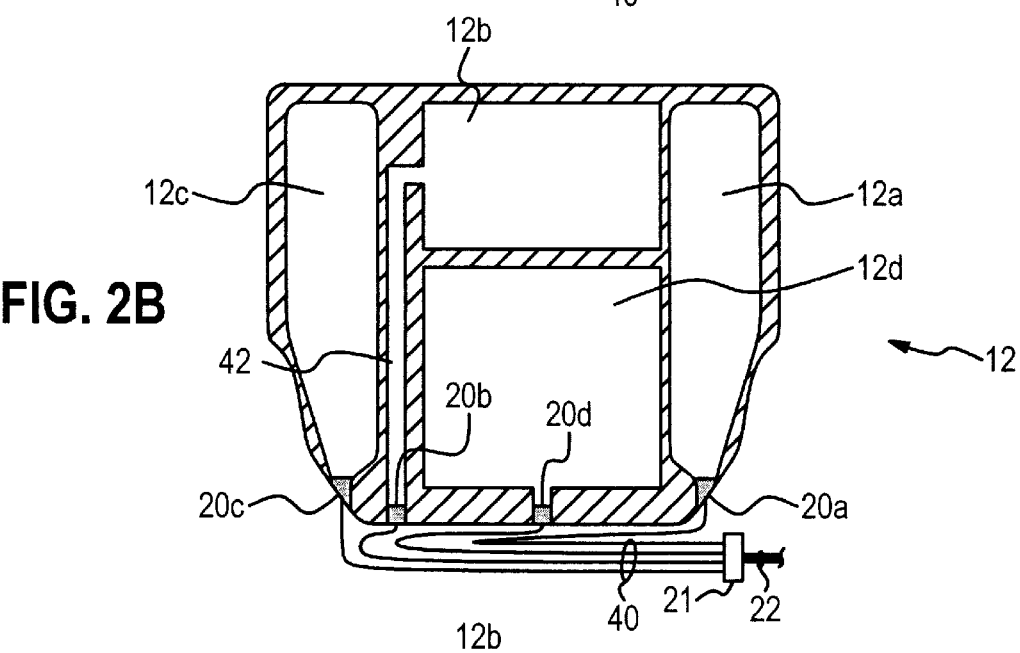
Figure 2C:
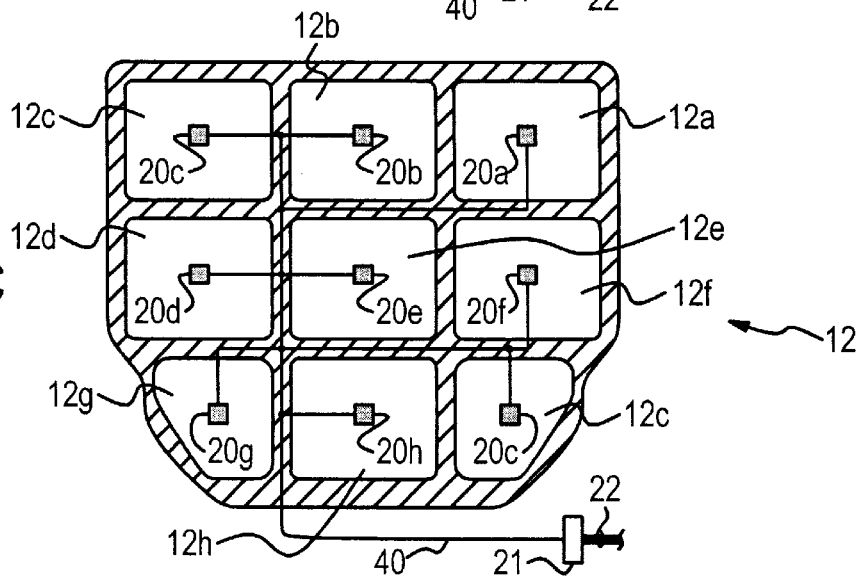
Figure 2D:
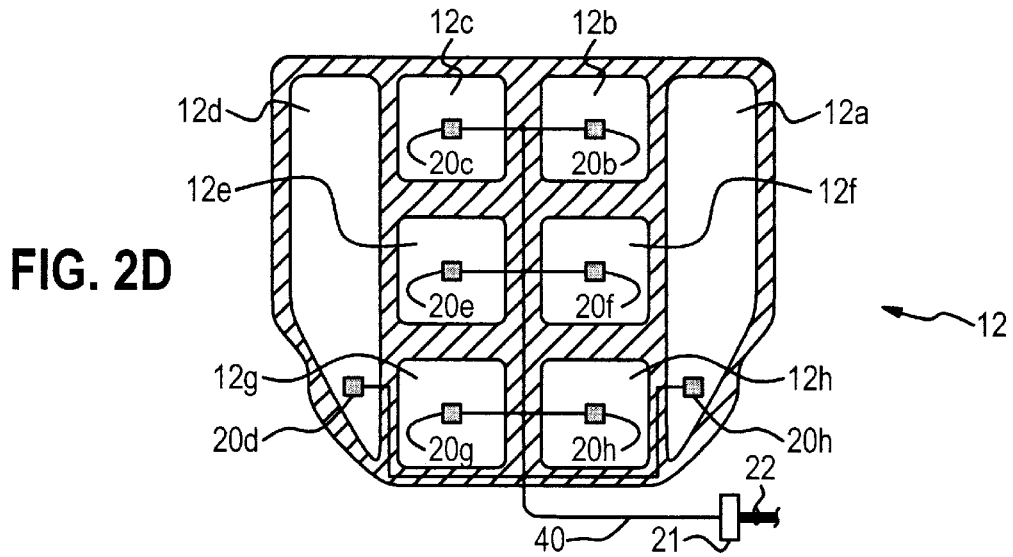
Figure 2E:
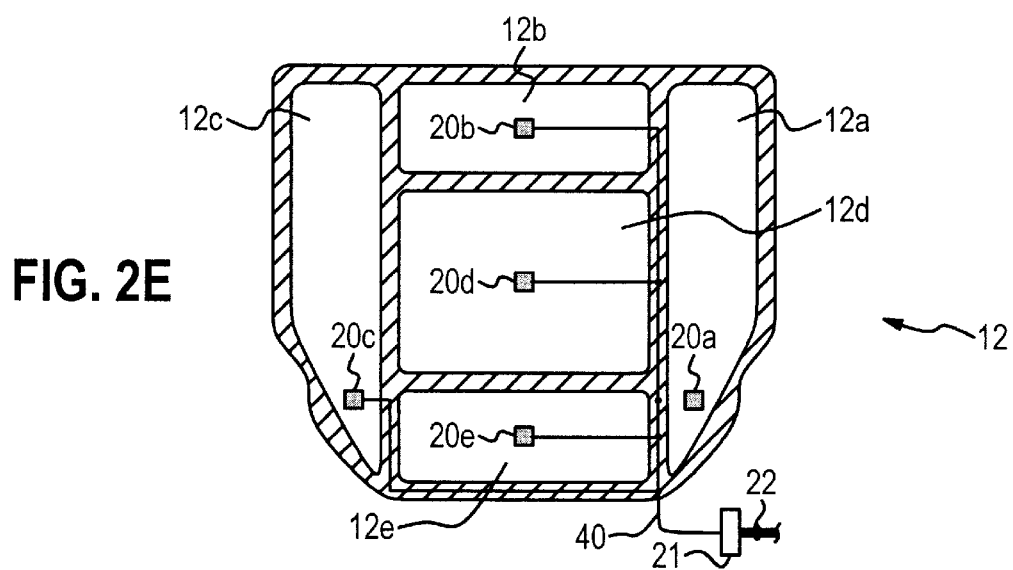
Figure 2F:
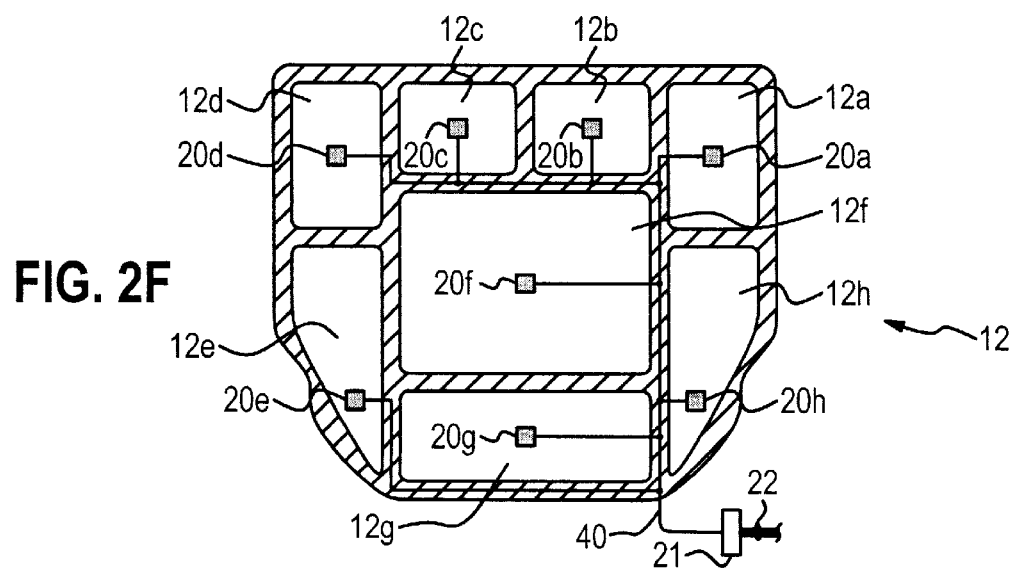

As indicated above, FIGS. 2A–2F depict alternate implementations of the fluid-filled bladder 12 of FIG. 1. FIGS. 2A and 2B depict four-chamber or quadrant designs for bench and side-bolster seat configurations, respectively, FIG. 2C depicts a nine-chamber configuration, FIGS. 2D and 2F depict eight-chamber configurations, and FIG. 2E depicts a five-chamber configuration. In each case, the hatched portions of the bladder 12 represent a weld pattern between upper and lower layers of the bladder that define the various individual fluid chambers 12a, 12b, etc., and in each case, conductors 40 carrying the pressure signals from the chambers 12a, 12b, etc. are joined at a connector 21 coupling the pressure signal bus 22 to PODS ECU 30. The pressure sensors 20a, 20b, etc. may be thin-film, piezoelectric or another type of pressure sensor.

In the embodiments of FIGS. 2A and 2B, pressure sensors 20a, 20b, 20c, 20d for detecting the fluid pressures in the four fluid-filled chambers 12a, 12b, 12c, 12d are disposed in a rearward portion of the bladder 12. In FIG. 2A, the pressure sensors 20c, 20d are simply positioned at the rearward edge of the chambers 12c, 12d, while the pressure sensors 20a, 20b are coupled to the respective chambers 12a, 12b by the fluid channels 42, 44. The bladder 12 of FIG. 2A includes two large chambers 12a, 12b at the front of the cushion 16, and two smaller chambers 12c, 12d toward the rear of the cushion 16. The bladder 12 of FIG. 2B includes a large chamber 12d centered in the rear of cushion 16, a smaller chamber 12b centered in the front of cushion 16, and two bolster chambers 12a, 12c, with the chamber 12b coupled to the pressure sensor 20b by the fluid channel 42.

In the embodiments of FIGS. 2C–2F, the pressure sensors 20a, 20b, etc. are disposed within the respective fluid-filled chambers 20a, 20b, etc., and the conductors 40 carrying the pressure signals are routed to the connector 21 through weld areas of the bladder 12, as shown. In the bladder 12 of FIG. 2C, there are nine chambers 12a, 12b, 12c, 12d, 12e, 12f, 12g, 12h, 12i of approximately equal size, each having a pressure sensor 20a, 20b, 20c, 20d, 20e, 20f, 20g, 20h, 20i. The bladder 12 of FIG. 2D is a side-bolster design having six small chambers 12b, 12c, 12e, 12f, 12g, 12h of approximately equal size in a central area of the cushion 16, and two larger bolster chambers 12a, 12d. The bladder 12 of FIG. 2E is also a side-bolster design; in this case, there is a large central chamber 12d, two smaller chambers 12b, 12e in the forward-central and rearward-central areas of cushion 16, and two large bolster chambers 12a 12c. Finally, the bladder 12 of FIG. 2F includes a large central chamber 12f, a smaller chamber 12g in the rearward-central area of cushion 16, two small chambers 12b, 12c in the forward-central area of cushion 16, and two bolster chambers 12a 12h; 12d, 12e in either side-bolster area of the cushion 16.

The variety of the above-described configurations illustrates that the chamber configuration for a given application will depend to a large degree on the shape and size of the seat 10. Also, the chambers 12a, 12b, etc. may be configured to facilitate reliable identification of an infant or child seat, as opposed to a normally seated occupant. In general, however, each of the illustrated embodiments enable the PODS ECU 30 to identify a portion of the seat cushion 16 where the highest of the sensed pressures occurs for purposes of compensating the composite or overall pressure as explained below.

Figure 3:
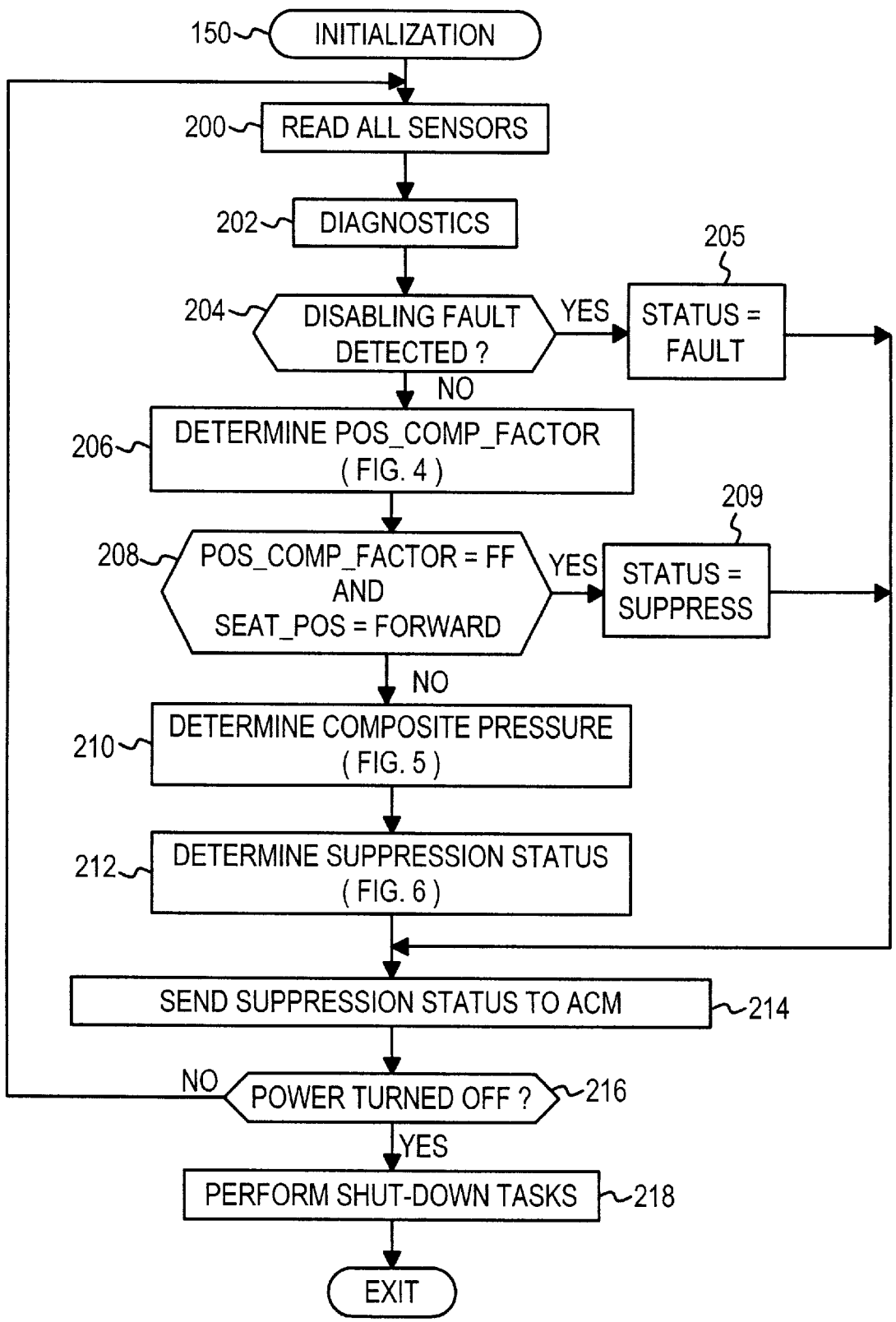
FIGS. 3, 4, 5 and 6 depict a flow diagram representative of a software routine executed by the PODS ECU of FIG. 1 in carrying out the method of this invention.

The flow diagrams of FIGS. 3–6 illustrate a software routine periodically executed by the PODS ECU 30 for carrying out this invention. The flow diagram of FIG. 3 represents a main or executive routine, whereas the flow diagrams of FIGS. 4–6 detail various steps of the main routine. At the initiation of each period of vehicle operation, the PODS ECU 30 executes an initialization routine as indicated by block 150 of FIG. 3 for initializing various registers, parameters and flags to zero or some other default setting. In the case of this invention, for example, the suppression status (STATUS) may be initialized to a default setting, or to a setting determined in the previous ignition cycle. A similar initialization also occurs in the event of a dynamic reset. Following initialization, the blocks 200–216 are repeatedly executed as shown. The blocks 200 and 202 read all of the sensor information (which may include seat belt latch and seat belt tension information) and perform diagnostic testing of the system and components. If the diagnostic testing detects a disabling fault, the block 204 is answered in the affirmative, and the block 205 sets the suppression status to FAULT. If there is no fault or the diagnostic tests detect a fault that is not disabling, such as a loss of fluid in one of the chambers 12a, 12b, etc., the blocks 206–212 are executed to determine the suppression status. The block 206 determines a position compensation factor POS_COMP_FACTOR based on a detected position of the occupant on the cushion 16, as explained below in reference to the flow diagram of FIG. 4. If the occupant is positioned forwardly on the cushion 16 (i.e., POS_COMP_FACTOR has been set to a forward factor FF) and the position (SEAT_POS) of seat 10 is substantially full forward, the block 208 is answered in the affirmative, and the block 209 sets the suppression status to SUPPRESS. Otherwise, the blocks 210 and 212 are executed to determine the composite pressure and the suppression status, as respectively detailed in the flow diagrams of FIGS. 5 and 6. The block 214 then sends the determined suppression status to ACM 32, and the block 216 checks for removal of system power. When system power is removed, the block 218 is executed to perform shut-down tasks, and the routine is exited.

Figure 4:
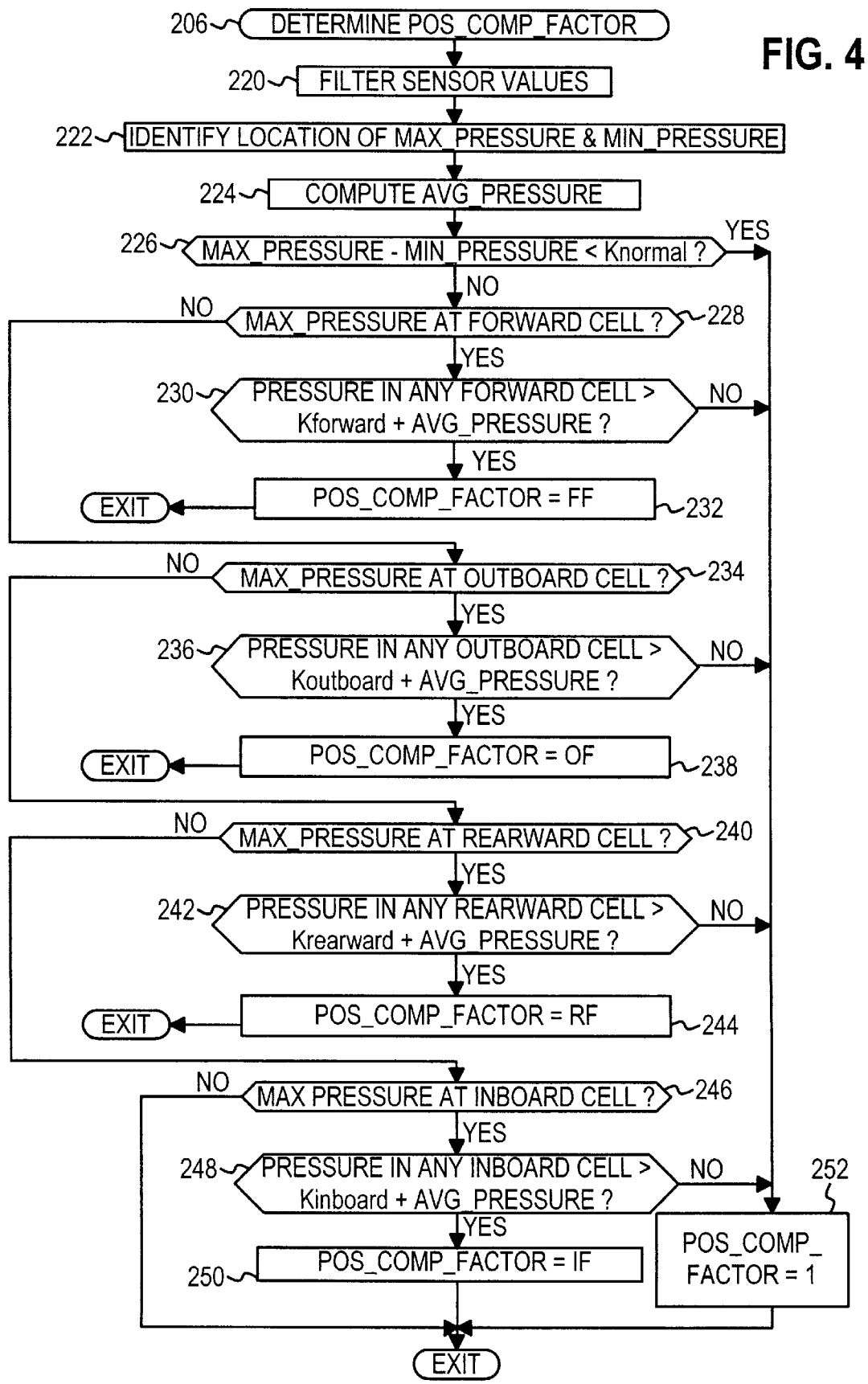

Referring to FIG. 4, determining the position compensation factor POS_COMP_FACTOR is achieved by executing the blocks 220–252 as shown. In general, this routine determines the relative position of the occupant based on the distribution of weight at each of the various chambers 12a, 12b, etc., and then assigns a corresponding value to POS_COMP_FACTOR. The process begins at block 220, where the pressure sensor signal values are low-pass filtered to average each of the respective pressure sensor signals. Then the block 222 identifies the highest (MAX_PRESSURE) and lowest (MIN_PRESSURE) of the filtered pressure signals, and the block 224 computes an average pressure (AVG_PRESSURE) by summing all of the filtered pressure signals and dividing the sum by the total number of pressure signals. If the difference between $MAX_{13}$ PRESSURE and MIN_PRESSURE is less than a reference value (Knormal), as determined at block 226, the occupant is considered to be normally seated, and the block 252 sets POS_COMP_FACTOR to one. If block 226 is answered in the negative and block 228 determines that the MAX_PRESSURE identified at block 222 occurs in a forward chamber (cell) of the bladder 12, the blocks 230 and 232 set POS_COMP_FACTOR equal to a calibrated forward factor FF such as 1.30, provided that the sensed pressure in any of the forward chambers exceeds AVG_PRESSURE by at least a predetermined value Kforward. Otherwise, the block 252 sets POS_COMP_FACTOR to one. If the block 228 is answered in the negative, the block 234 is executed to determine if the MAX_PRESSURE identified at block 222 occurs in an outboard chamber (cell) of the bladder 12. If so, the blocks 236 and 238 set POS_COMP_FACTOR equal to a calibrated outboard factor OF, such as 1.20, provided that the sensed pressure in any of the outboard chambers exceeds AVG_PRESSURE by at least a predetermined value Koutboard. Otherwise, the block 252 sets POS_COMP_FACTOR to one. If the block 234 is answered in the negative, the block 240 is executed to determine if the MAX_PRESSURE identified at block 222 occurs in a rearward chamber (cell) of the bladder 12. If so, the blocks 242 and 244 set POS_COMP_FACTOR equal to a calibrated rearward factor RF, such as 1.50, provided that the sensed pressure in any of the rearward chambers exceeds AVG_PRESSURE by at least a predetermined value Krearward. Otherwise, the block 252 sets POS_COMP_FACTOR to one. And if the block 240 is answered in the negative, the block 246 is executed to determine if the MAX_PRESSURE identified at block 222 occurs in an inboard chamber (cell) of the bladder 12. If so, the blocks 248 and 250 set POS_COMP_FACTOR equal to a calibrated value inboard factor IF, such as 1.20, provided that the sensed pressure in any of the inboard chambers exceeds AVG_PRESSURE by at least a predetermined value Kinboard. Otherwise, the block 252 sets POS_COMP_FACTOR to one.

It will be appreciated that with certain implementations of the bladder 12, a given fluid-filled chamber 12*a*, 12*b*, etc. may be considered as both a forward or rearward chamber and an inboard or outboard chamber. In the implementation of FIG. 2C, for example, the chamber 12*a* can be considered as both a forward chamber (for purposes of blocks 228–230) and an outboard chamber (for purposes of blocks 234–236). Thus, the order of the blocks 228, 234, 240 and 246 may be important for such implementations, with the most significance (highest priority) being attached to the first block to be executed. In general, detection forward-leaning occupants is accorded highest priority for a frontal air bag, so block 228 is executed prior to blocks 234, 240 and 246. In the case of a side air bag on the other hand, it may be desired to execute block 234 prior to blocks 228, 240 and 246, for example.

As explained below in reference to the flow diagram of FIG. 6, POS_COMP_FACTOR is applied to a weighted and filtered composite pressure FILT_PRESSURE to form a compensated pressure COMP_PRESSURE that is compared to predetermined thresholds to determine the suppression status. For example, if COMP_PRESSURE is greater than a threshold Kadult indicative of a child occupant, the PODS ECU 30 concludes that the seat 10 is occupied by an adult and STATUS is set to ALLOW so that restraint deployment is enabled in a sufficiently severe crash event. However, if the same occupant is positioned toward an edge of the cushion 16, FILT_PRESSURE tends to be lower than if the occupant were normally seated, and the block 208 sets POS_COMP_FACTOR to a calibrated value (FF, IF, OF or RF), which has the effect of increasing COMP_PRESSURE to a value that more accurately indicates the occupant weight.

Figure 5:
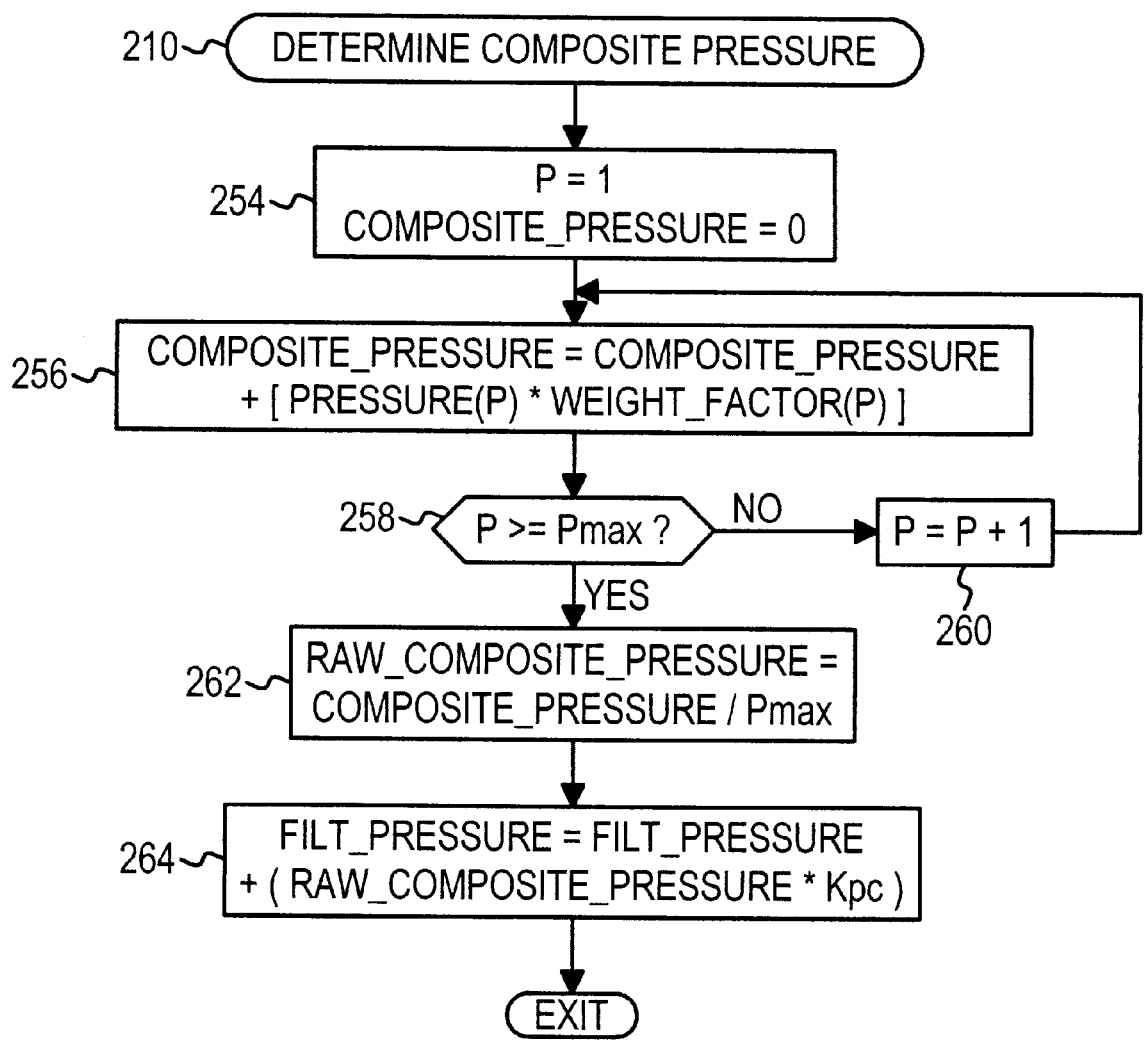

Referring to FIG. 5, determining COMPOSITE_PRESSURE involves weighting and summing the various sensed pressures, and then filtering the result. The block 254 initializes the process by setting a sensor position value P to one, and resetting COMPOSITE_PRESSURE to zero. The block 256 then increases COMPOSITE_PRESSURE by the product PRESSURE(P) * WEIGHT_FACTOR(P), where PRESSURE(P) is the filtered pressure sensor value for the Pth sensor position, and WEIGHT_FACTOR(P) is a calibrated gain or weight associated with the Pth sensor position. So long as P is less than the total number pmax of sensor positions for the bladder 12, as determined at block 258, the block 260 is executed to increment P, whereafter blocks 256 and 258 are re-executed. When block 258 is answered in the affirmative, the block 262 calculates RAW_COMPOSITE_PRESSURE by dividing the weighted sum COMPOSITE_PRESSURE by Pmax, and the block 264 low-pass filters the result using a filter gain Kpc to form the filtered pressure FILT_PRESSURE.

Figure 6:
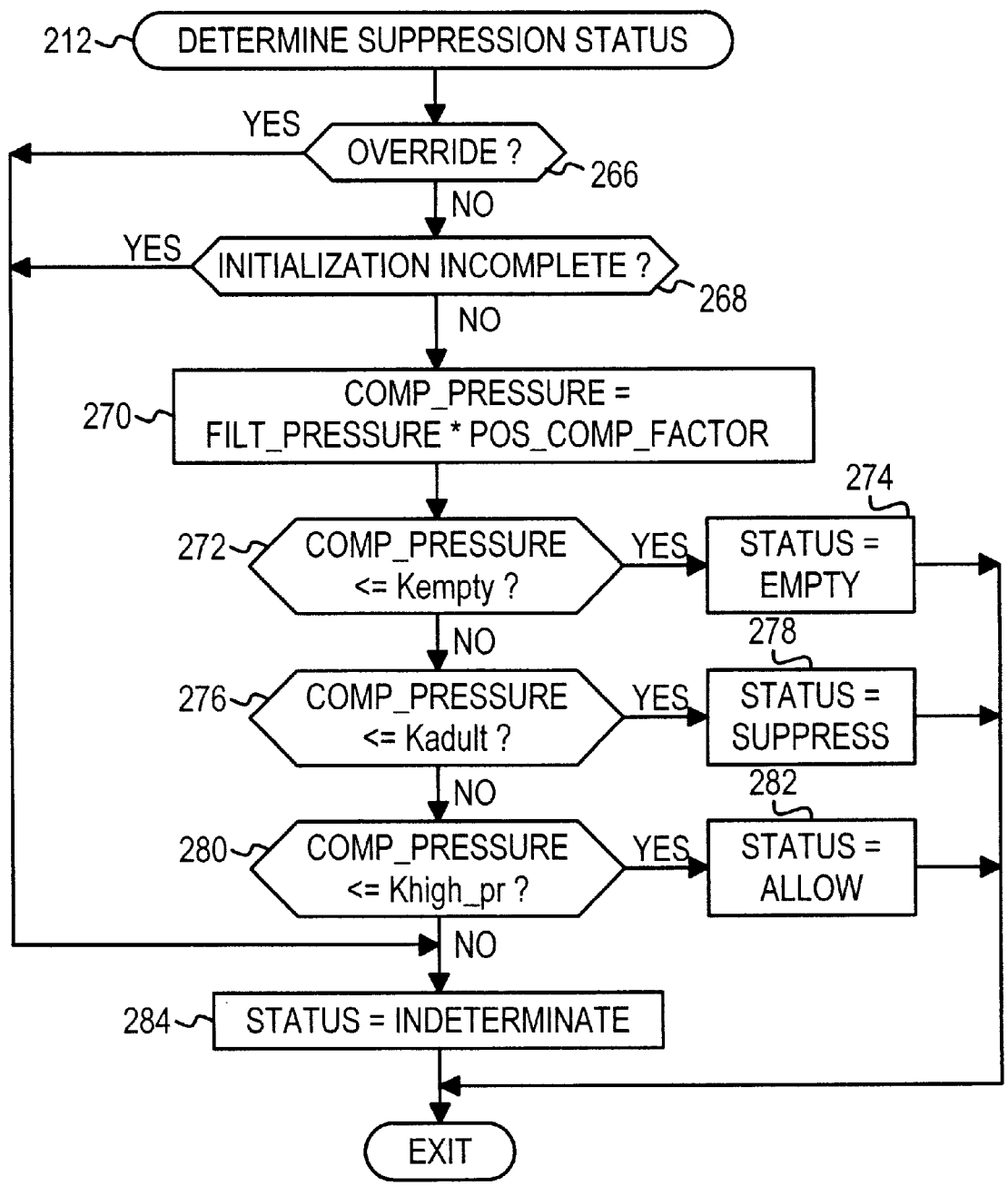

Referring to FIG. 6, determining the suppression status generally involves compensating FILT_PRESSURE based on POS_COMP_FACTOR, and comparing the result to various predetermined thresholds. Initially, the blocks 266 and 268 are executed to determine if there has been a driver-override of the occupant sensing system or if system initialization has not been completed. In either case, the block 284 is executed to set STATUS to INDETERMINATE, and the routine is exited. Usually, however, blocks 266 and 268 will be answered in the negative, and the block 270 is executed to compute a compensated pressure COMP_PRESSURE according to the product of FILT_PRESSURE and POS_COMP_FACTOR. If COMP_PRESSURE is less than or equal to a predetermined low threshold Kempty indicative of an unoccupied seat, the blocks 272 and 274 detect the condition and set STATUS to EMPTY, completing the routine. If COMP_PRESSURE exceeds Kempty, but is less than or equal to a predetermined threshold Kadult indicative of child occupant (a occupant smaller than a $5^{th}$ percentile adult female, for example), the blocks 276 and 278 detect the condition and set STATUS to SUPPRESS. If COMP_PRESSURE exceeds Kadult but is less than an unrealistically high threshold Khigh_pr, the blocks 280 and 282 detect the condition and set STATUS to ALLOW. If COMP_PRESSURE exceeds Khigh_pr, a reliable indication of occupant position cannot be obtained, and the block 284 is executed to set STATUS to INDETERMINATE. Although not shown, the routine will preferably include a degree of hysteresis to prevent STATUS from toggling between two different states; once STATUS stabilizes in a given state, the hysteresis values can be increased to reduce sensitivity to road noise, occupant movement, and so on.

In summary, the system of this invention provides inexpensive and reliable determination of whether deployment of an inflatable restraint should be allowed or suppressed based on both occupant weight and position on a vehicle seat. While described in reference to the illustrated embodiment, it is expected that various modifications will occur to persons skilled in the art. For example, this invention is not limited to a particular bladder configuration, and may be used to determine if deployment of other restraints such as side air bags should allowed or suppressed. Accordingly, it should be understood that occupant detection systems incorporating these and other modifications may fall within the scope of this invention, which is defined by the appended claims.

What is claimed is:

1. Apparatus for determining whether deployment of an inflatable restraint for an occupant of a vehicle seat should be allowed or suppressed, comprising:

a polymeric bladder disposed in or under a bottom cushion of said seat, said bladder having a plurality of individual fluid-filled chambers arranged in different regions of said cushion to be responsive to occupant weight in at least forward, rearward, inboard and outboard regions of said cushion, with no fluid flow between such chambers;

pressure sensors for sensing fluid pressures in said individual fluid-filled chambers; and a controller responsive to pressure signals developed by said pressure sensors for determining a composite pressure representative of a weight of the occupant, determining a position of said occupant on said bottom cushion based on relative magnitudes of said pressure signals, adjusting said composite pressure in a direction that favors allowing deployment of said inflatable restraint when it is determined that the occupant is primarily positioned on said forward, rearward, inboard or outboard regions of said bottom cushion, and determining if deployment of the inflatable restraint should be allowed or suppressed based on the adjusted composite pressure.

2. The apparatus of claim 1, wherein said controller identifies maximum and minimum pressure signals and an average of said pressure signals, and determines that said occupant is positioned primarily on said forward, rearward, inboard or outboard regions of said bottom cushion when a difference between the identified maximum and minimum pressure signals exceeds a threshold and a pressure signal developed by a pressure sensor for the forward, rearward, inboard or outboard regions of said bottom cushion exceeds the identified average by at least a predetermined amount.

3. The apparatus of claim 1, wherein said controller determines a position compensation factor based on the determined position of said occupant, and applies such factor to said composite pressure to compensate said composite pressure for occupant position when said occupant is primarily positioned on said forward, rearward, inboard or outboard regions of said bottom cushion.

* * * * *